United States Patent
Drapala et al.

(10) Patent No.: US 8,478,920 B2
(45) Date of Patent: Jul. 2, 2013

(54) CONTROLLING DATA STREAM INTERRUPTIONS ON A SHARED INTERFACE

(75) Inventors: Garrett M. Drapala, Poughkeepsie, NY (US); Kenneth D. Klapproth, Austin, TX (US); Robert J. Sonnelitter, III, Wappingers Falls, NY (US); Craig R. Walters, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 12/822,333

(22) Filed: Jun. 24, 2010

(65) Prior Publication Data

US 2011/0320657 A1    Dec. 29, 2011

(51) Int. Cl.
*G06F 13/00* (2006.01)
(52) U.S. Cl.
USPC ........... 710/107; 710/240; 710/241; 710/244; 710/260
(58) Field of Classification Search
USPC .......................... 710/240–244, 260, 262, 264
See application file for complete search history.

(56) References Cited

U.S. PATENT DOCUMENTS

| | | | | |
|---|---|---|---|---|
| 5,668,975 | A * | 9/1997 | Coddington | 711/169 |
| 6,134,625 | A * | 10/2000 | Abramson | 710/241 |
| 6,775,727 | B2 * | 8/2004 | Moyer | 710/113 |
| 7,013,339 | B2 * | 3/2006 | Schwager | 709/226 |
| 7,028,150 | B2 * | 4/2006 | McAllister et al. | 711/156 |
| 7,032,134 | B2 * | 4/2006 | Abdo et al. | 714/37 |
| 7,464,180 | B1 * | 12/2008 | Jacobs et al. | 709/240 |
| 7,543,093 | B2 * | 6/2009 | Chou et al. | 710/105 |
| 2005/0172091 | A1 * | 8/2005 | Rotithor et al. | 711/157 |
| 2007/0283131 | A1 | 12/2007 | Sagalovitch et al. | |
| 2011/0302336 | A1 * | 12/2011 | Naylor | 710/35 |

FOREIGN PATENT DOCUMENTS

WO    WO 2010069398 A1 *  6/2010

* cited by examiner

*Primary Examiner* — Brian Misiura
(74) *Attorney, Agent, or Firm* — Cantor Colburn LLP; John Campbell

(57) ABSTRACT

A mechanism for controlling data stream interruptions on a shared bus is provided. A first request is received to transfer data. High priority data components and low priority data components are determined for the first request. The high priority data components are transferred without interruptions. In response to receiving requests when transferring the high priority data components, the received requests are rejected.

16 Claims, 5 Drawing Sheets

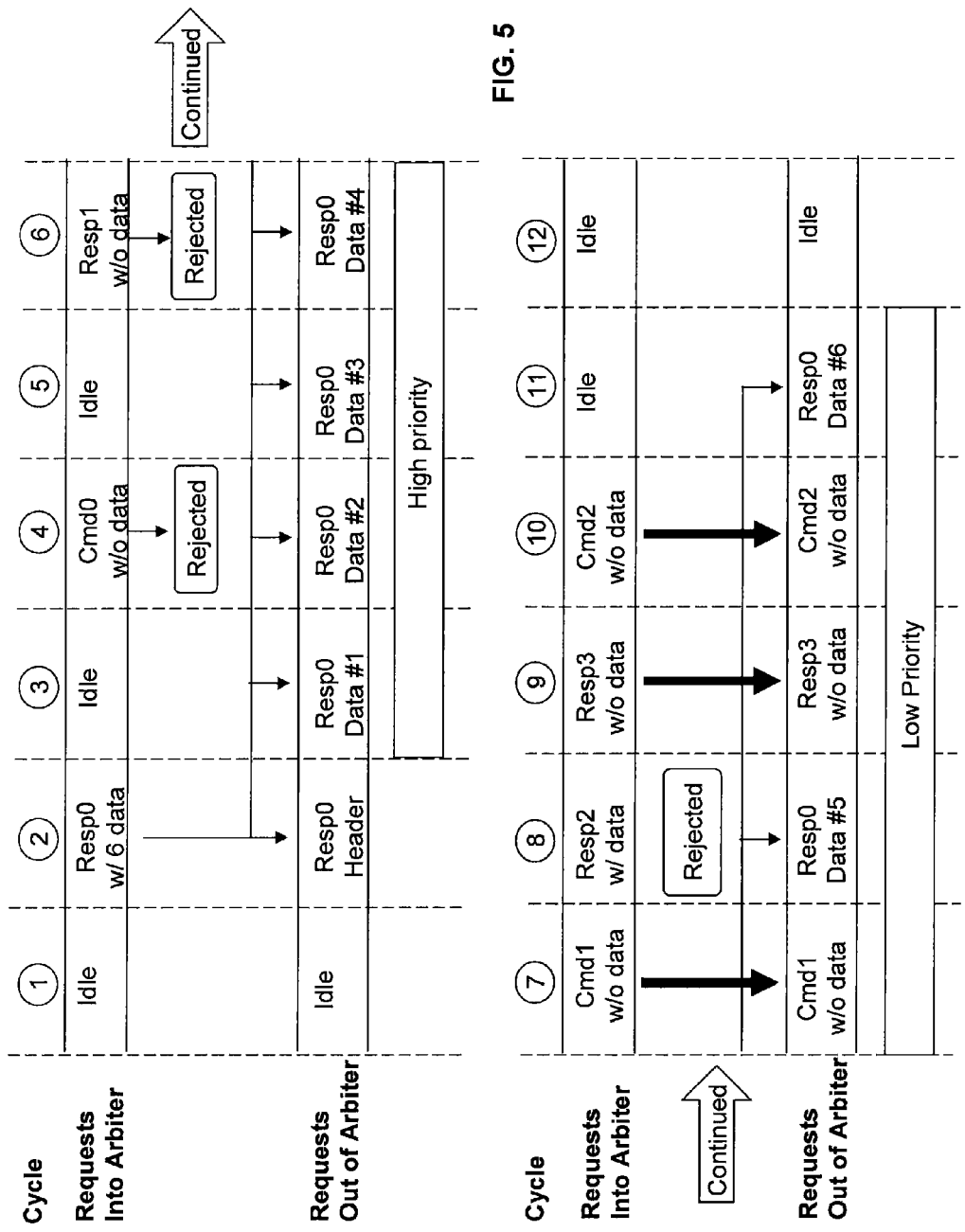

CONTROLLING DATA STREAM INTERRUPTIONS ON A SHARED INTERFACE

BACKGROUND

Exemplary embodiments relate generally to processing for computer chips within a computing environment, and more particularly to transferring data between chips.

In a computer system consisting of multiple central processors and cache chips, these chips must be interconnected so that data can be fetched, stored, and shared across the computer system. Conventionally, these command, response, and data transfers across the chip-to-chip interfaces have separate physical connections so that these operations (e.g., command, response, and data) do not interfere with each other. However, physical constraints may demand that these operations share a common physical link between chips. How these operations are multiplexed across the interface can have an impact on the overall performance of the system.

Strictly favoring data transfers over commands and responses that do not have data associated with them can cause a significant delay in getting the initial memory access command from the requesting central processor (also called central processor unit (CPU)) to memory, as the initial memory access command could be delayed many cycles at each chip-to-chip interface by ongoing data transfers. Alternatively, strictly favoring commands and responses without data over data transfer operations can cause fetch data for an earlier command to be unnecessarily delayed by newer commands. Some systems address this issue by strictly time-slicing access to the interface amongst the competing requestors. A three-cycle time slice scheme could allow command, response, and data elements to all be sent with maximum fairness. A strict time-slice scheme could have commands and responses share a slot, with data using another slot in a two-cycle time slice. Additionally, multiple data cycles could be incorporated into the sequence, as in a scheme which shares command and responses in 1 cycle, followed by 4 or 8 data cycles in a repeating sequence. However, in such schemes, data streams may be interrupted by empty command/data cycles, or streams of commands/responses may accumulate as they wait for their slot to become available on the interface, even when no data transfers are in progress.

BRIEF SUMMARY

An exemplary embodiment includes a computer implemented method for controlling data stream interruptions on a shared bus. A first request is received to transfer data. High priority data components and low priority data components are determined for the first request. The high priority data components are transferred without interruptions. In response to receiving requests when transferring the high priority data components, the received requests are rejected.

Another exemplary embodiment includes an arbiter configured to control data stream interruptions on a shared bus. An input and an output are provided receiving and sending. Logic gates configured to receive a first request to transfer data via the input. The logic gates are configured to determine high priority data components and low priority data components for the first request. The logic gates are configured to transfer the high priority data components without interruptions via the output. In response to receiving requests when transferring the high priority data components via the input, the logic gates are configured to reject the requests.

Further exemplary embodiments include a computer implemented method for controlling data stream interruptions on a shared bus. A request is received to transfer data by an arbiter. High priority data components of the request are transferred. Transferring of the high priority data components is allowed uninterrupted by other requests received at the arbiter.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 5 depicts a bus priority example timing diagram in accordance with exemplary embodiments.

DETAILED DESCRIPTION

Exemplary embodiments provide a mechanism/method that splits data transfers into critical data components (e.g., high priority data) and less critical data components (e.g., lower priority data). The critical components are sent as highest priority across the various chip-to-chip interfaces. The less critical data components are sent as lower priority, with commands and responses that do not have data associated with sent in between the less critical commands. The less critical portions of data transfers can be interrupted by other commands and responses, as long as those commands and responses do not have data associated with them. A set of rules as to the frequency and number of interruptions allows the total number of cycles for any given data transfer operation to be constrained to some deterministic limit. This mechanism/method of exemplary embodiments provides a balance between latency and fairness to optimize overall system performance.

Figure 1:
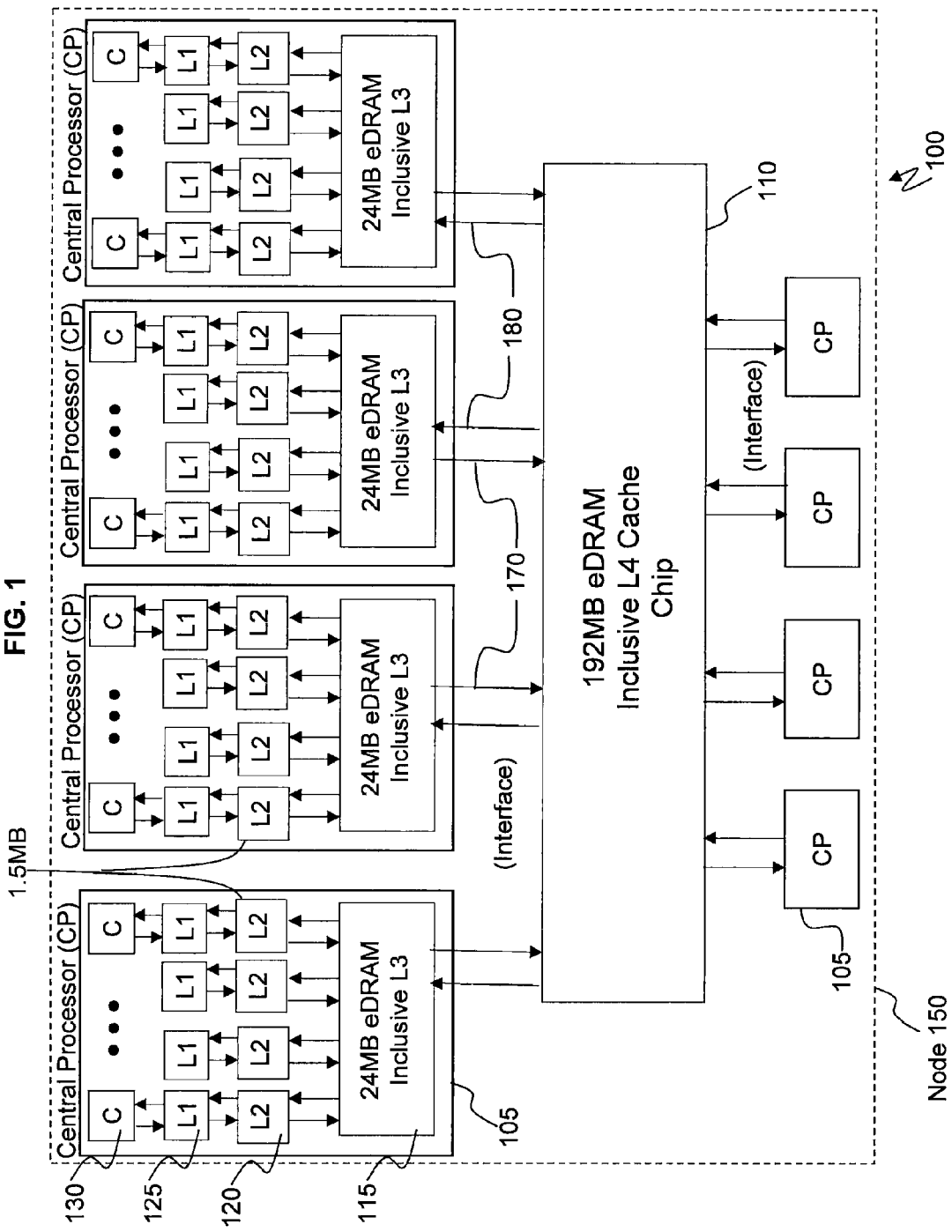
FIG. 1 depicts a state of the art cache topology.
Figure 2:
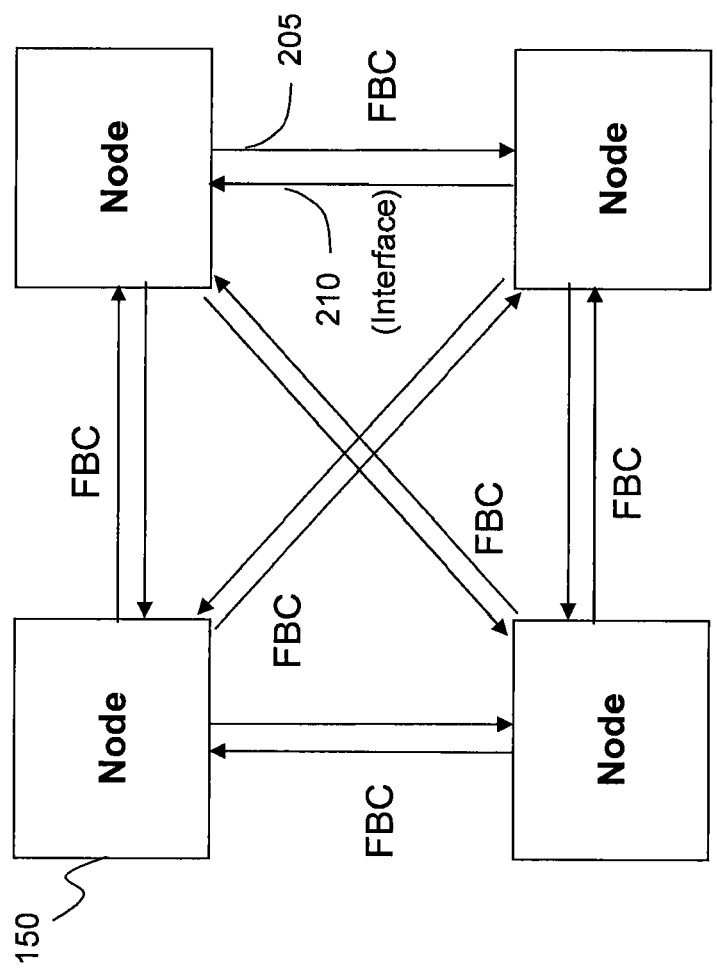
FIG. 2 depicts an example of multiple nodes operatively connected to one another.

FIG. 1 illustrates a state of the art cache topology 100. FIG. 1 illustrates a plurality of central processors (CP) 105 (also referred to as central processing units) operatively connected via busses to one or more L4 caches 110. Each of the central processors (CP) 105 includes one or more cores 130 which perform the reading and executing of instructions. On each central processor (CP) 105, the multiple cores 130 are operatively connected via busses to the L1, L2, and L3 caches 125, 120, and 115 as understood by one skilled in the art. The L1 caches 125 are physically closest to the cores 130, next are the L2 caches 120, and then the L3 caches 115. It is understood that the designation of caches could be reversed. Although the L3 and L4 caches 115 and 110 may comprise embedded dynamic random access memory (DRAM) which is referred to as eDRAM, it is understood by a skilled artisan that any other types of suitable memory such as DRAM may be utilized. A plurality of central processors 105 operatively connected to the L4 caches 110 (e.g., two L4 caches) form a node 150. In a computing system, multiple such nodes 150 may be operatively connected to one another for communicating such as making and responding to requests along with transferring and storing data, as understood by one skilled in the art. FIG. 2 illustrates an example of multiple nodes 150 operatively connected to one another via, e.g., a fabric.

Each individual central processor 105 is fabricated on its own separate chip, which includes the L1, L2, and L3 caches 125, 120, and 115, and the L4 cache 110 is fabricated on its own separate chip. As understood by a skilled artisan, fabrication of chips including integrated circuits, wires, metal layers, semiconductor (and/or other material) components, etc., may be formed via lithography and other techniques. The fabrication process may include various deposition techniques including physical vapor deposition (PVD), chemical vapor deposition (CVD), electrochemical deposition (ECD), molecular beam epitaxy (MBE), and atomic layer deposition (ALD) among others.

In FIG. 1, arrow 170 represents a bus operatively connecting one chip to another chip and represents the interconnection flowing (in one direction) from the L4 cache 110 chip to the central processors 105 chips. Arrow 180 represents a bus operatively connecting one chip to another and represents the interconnection flowing (in another direction) from the central processors 105 chips to the L4 cache 110 chip. Likewise, in FIG. 2, arrow 205 represents a bus operatively connecting one chip to another chip and represents the interconnection flowing (in one direction) from one node 150 to another node 150. Arrow 210 represents a bus operatively connecting one chip to another chip and represents the interconnection flowing (in another direction) from one node 150 to another node 150. These busses 170, 180, 205, and 210 flowing in both directions are chip-to-chip interfaces. As mentioned herein, each direction previously included two busses: one bus for data transfers and one bus for commands and responses. Now, however, there is one bus in a first direction (e.g., the bus 170) and another bus in a second direction (e.g. the bus 180).

Figure 3:
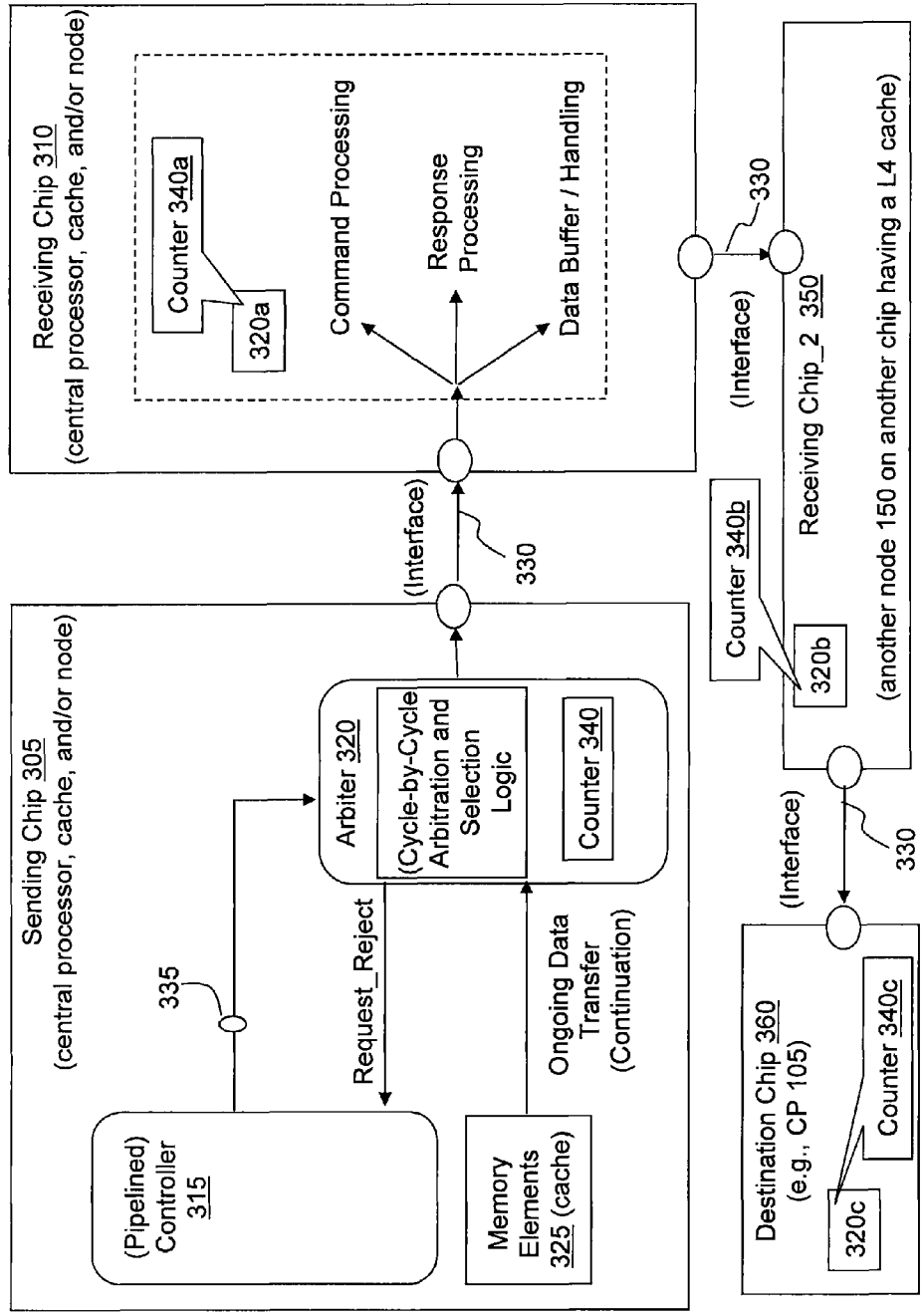
FIG. 3 depicts an example of bus priority in accordance with exemplary embodiments.

Now turning to FIG. 3, FIG. 3 illustrates an example of bus priority in accordance with exemplary embodiments. A sending chip 305 represents elements of bus priority for the central processors 105, the L4 cache 110, the nodes 150, and any other chip that sends and receives signals. A receiving chip 310 represents any chip that receives signals, which also may include the central processors 105, the L4 cache 110, and the nodes 150. Although the receiving chip 310 includes the elements of the sending chip 305 for implementing bus priority, the details of the receiving chip 310 are not illustrated in FIG. 3 so as not to obscure the diagram. It is understood that the receiving chip 310 can in turn be the sending chip 305 to send signals to another chip and/or back to the same chip.

Figure 4:
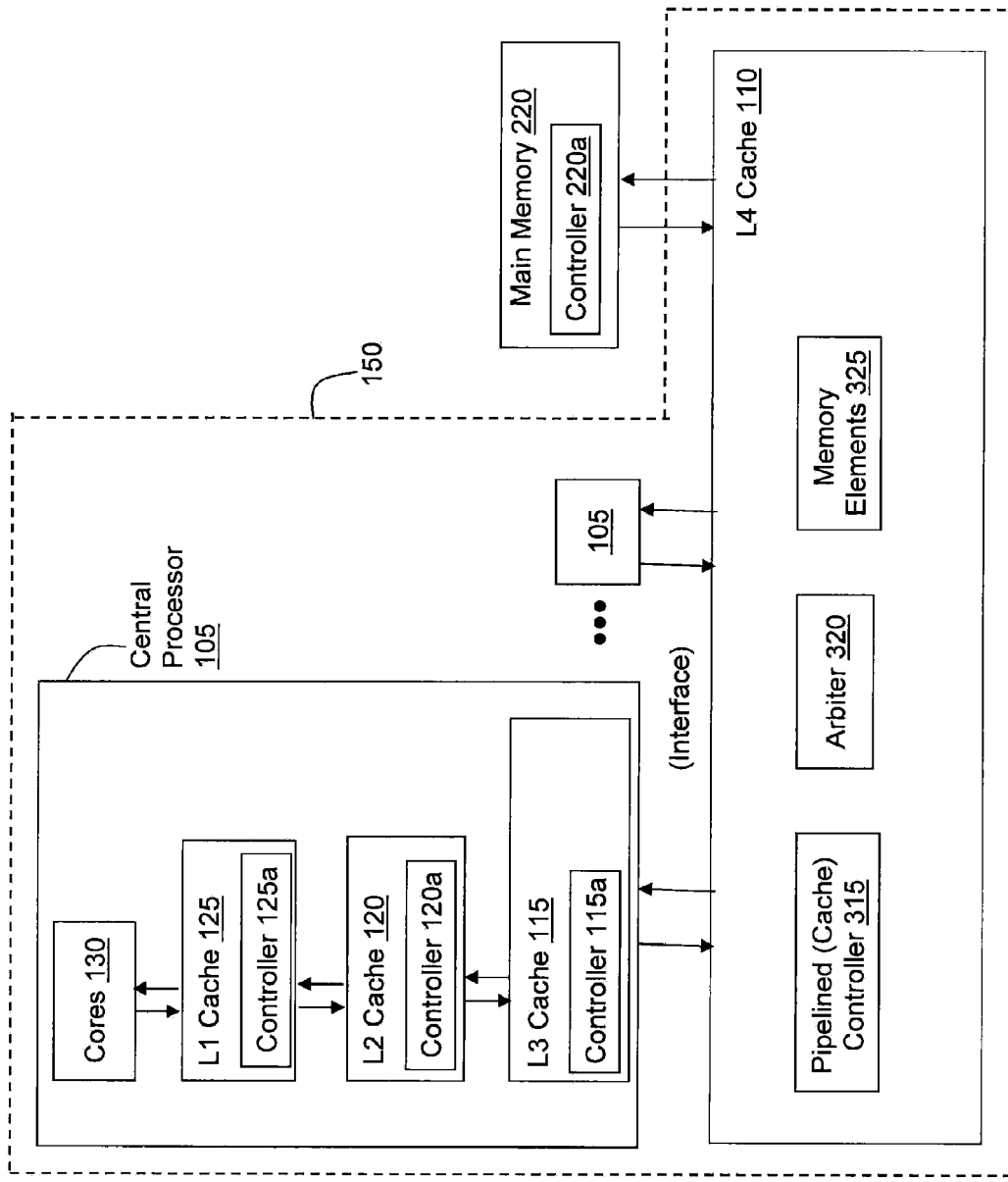
FIG. 4 depicts further details according to exemplary embodiments.

As a scenario, consider a computer system of multiple central processor 105 chips, each containing one or more cores 130 (e.g., central processor units (CPU)) and associated private (e.g., L1 cache 125 and L2 cache 120) and/or shared caches (e.g., L3 cache 115 and L4 cache 110). The central processor 105 chip may also contain one or more memory controllers and/or I/O controllers. FIG. 4 illustrates further details of the L4 cache 110 and the central processors 105 according to exemplary embodiments. The L1 cache 125, L2 cache 120, and L3 cache 115 respectively include controllers 125a, 120a, and 115a for managing and controlling operations of the caches as understood by one skilled in the art. Main memory 220, which is operatively connected to the L4 cache 110, includes memory controller 220a.

Several central processor 105 chips are operatively connected to one or more separate chip(s) containing cache storage, such as the L4 cache 110, and an interconnection matrix for all of the attached central processor 105 chips (as seen in FIGS. 1, 2, 3, and 4). As mentioned herein, the set of central processor 105 chips and (e.g., 2) L4 cache chips 110 are packaged together to form the nodes 150. The L4 cache 110 chip(s) also contain connections to other L4 cache chips on other nodes 150 to form a complete system as seen in FIG. 2. The inter-connections between these chips (central processor 105, L4 cache 110, and nodes 150) carry commands from the core 130 and responses from memory 220, I/O (input and output) controllers, the various caches 125, 120, 115, and 110 and/or from other core's 130 (on other central processor 105 chips and other nodes 150).

Commands have two forms: commands with data associated with them (as with store commands with corresponding store data) and commands that do not (as with memory fetch commands). Likewise, responses have two forms: responses with data associated (as with memory fetch responses with corresponding fetch data) and responses that do not (as in store command completion responses). Commands and responses without data generally require a single transfer across the chip interfaces (such as busses 170, 180, 205, and/or 210). Most operations with data associated with them provide a full cache line of data via a stream of multiple data transfers, with the specifically requested component/unit of data provided first followed by the remaining components of data in the cache line. For example, a command requesting data of a cache line is actually requesting a subset of the full cache line, but not the entire cache line. That is, the central processor 105 requests a specific address within the cache line. However, cache controllers are designed to send the central processor 105 the full cache line of data assuming that the remainder of the cache line (not specifically requested) will eventually be needed.

Also, as mentioned herein, ideally, the commands, responses, and data across a given chip-to-chip interface will utilize separate paths, so as to not interfere with each other. However, physical packaging limitations typically require that these events share a common pathway between chips. How commands, responses and data share this common pathway (i.e., bus) is an issue that impacts the performance level of the overall system.

Referring back to FIG. 3, assume that an arbiter 320 of the sending chip 305 sends a full cache line of data via a stream of uninterrupted data transfers over bus 330 to the receiving chip 310 as conventionally done; by, sending this full cache line of data, this requires that commands and responses with no data associated with them wait for many cycles for the data transfer to complete, which adds significantly to the latency associated with those commands and responses. The bus 330 may be busses 170, 180, 205, and/or 210. Reference 335 illustrates the type of requests sent from a pipeline controller 315 to the arbiter 320. The pipeline controller 315 can issue a request for a specific interface action every cycle, with the requested action being one of the following: command accompanied with data, command (only, i.e., with no data), response accompanied with data, and response (only, i.e., with no data).

The method of exemplary embodiments, however, allows commands, responses, and data to share a common pathway (such as one bus in one direction, e.g., busses 170, 180, 205, and/or 210) between chips with a minimum of additional delay.

In exemplary embodiments, data transfers are divided into three elements by the arbiter 320: (1) the command and/or response header, signaling the start of the data transfer; (2) the critical data elements (the specific address within a cache line), specifically requested by the originating core 130; and (3) the less critical remaining data components required to provide an entire (full) cache line of data. The arbiter 320 is configured to combine the command and/or response data transfer header along with the specifically requested data, and the arbiter 320 sends them as a short, uninterrupted stream of transfers. The remaining data components (which are the remainder of the cache line not specifically requested by the core 130) are sent by the arbiter 320 in a stream of data transfers that may or may not be interrupted by one or more commands and/or responses that do not have data associated with them. The remaining stream of data may also be interrupted by idle or null cycles.

A command/response (which means command and/or response) with data originating on a central processor 105 chip, may as a worst case have to send data to a central processor 105 chip on another node 150. For example, this means sending data from the originating central processor 105 chip (assume for this case the sending chip 305) to its attached L4 cache chip 110 (assume for this case the receiving chip 310), across to the cache chip on the other node 150 (assume for this case receiving chip_2 350, and then on to the destination central processor 150 chip (assume for this case destination chip 360). Interruptions can be introduced at each chip-to-chip crossing. Without constraints, it would be difficult to define the maximum number of cycles it could take to complete the entire cache line data transfer operation. Exemplary embodiments accordingly defines a set of rules to allow the maximum possible data transfer operations to be limited to 2× of (twice) the minimum, fully uninterrupted case (measured from the command/response header to the last data component/unit). Each chip 310, 350, and 360 includes its own arbiter 320a, 320b, and 320c configured as arbiter 320 for receiving/sending responses, commands, and data according to exemplary embodiments; each chip 310, 350, and 360 also includes its own (pipelined) controller 315 and memory elements 325, which are not show for conciseness.

The rules (of the arbiters 320, 320a, 320b, and 320c) for sending data may be as follows:

1) At each chip-to-chip crossing, the command/response with data header is sent along with the specifically requested portion of the cache line of data in an uninterrupted stream of transfers. This assures minimum latency in servicing the specific request.

2) The remaining components/units of data are sent in a subsequent stream of data transfers that can be interrupted by other commands/responses which do not have data associated with them, or by idle/null cycles. This allows the specifically requested component of the data transfer to be sent or forwarded immediately without having to wait for the remainder of the data to be accumulated.

3) A maximum number of allowable interruptions is established and enforced at the final, cache-to-CP chip interface (e.g., such as the receiving chip_2 350 to destination chip 360 interface). This total number of allowed interruptions should be (e.g., is designed in the arbiters 320 and 320a-c to be) apportioned across the 3 chip-to-chip crossings/interfaces, with each crossing point enforcing its lower, apportioned interruption limit. Counters 340, 340a, 340b, and 340c are configured to count the number of interruptions to the low priority data transfers in respective arbiters 320 and 320a-c. In this example, arbiter 320c is in the destination chip 360 so the counter 340a is not utilized but when the direction of the data transfer is reversed, the counter 340c would count the interruptions as disused herein. The counters 340, 340a, and 340b within arbiters 320, 320a, and 320b are configured to limit the number of interruptions inserted by each arbiter. For example, the counter 340 within arbiter 320 may be programmed to allow arbiter 320 to insert a maximum of 3 interruptions, while counters 340a and 340b within arbiters 320a and 320b may be programmed to allow them to insert a maximum of 1 interruption (each). With this configuration, for transfers originating in sending chip 305 and passing through receiving chips 310 and 350 and ending in destination chip 360, there could be a maximum of 5 interruptions in each transfer seen on the interface into the destination chip 360. Note that the counter 340 (340a and 340b) limits may be dynamically assigned from multiple limit values depending on whether the transfer is originating from that arbiter (e.g., arbiter 320) and/or passing through that arbiter (e.g. arbiter 320a and 320b), so if receiving chip_2 350 were to originate a data transfer to destination chip 360, the receiving chip_2 350 could insert all of the overall maximum of 5 interruptions itself, since there are no other upstream interfaces participating in the transfer.

Note that as the cache line of data is streamed across the chip-to-chip interfaces and from input ports to output ports across the cache chips, interruptions introduced upstream provide opportunities for downstream interfaces to be insert other commands/responses without data. The interrupting commands/responses without data do not necessarily have the same destination as the data. So a command interruption introduced on the first CP-to-cache chip interface (e.g., from the sending chip 305 to the receiving chip 310) may cause an idle/null interruption in the subsequent cache-to-cache chip interface (e.g., from the receiving chip 310 to the receiving chip_2 350) and the final cache-to-CP chip interface (e.g., from receiving chip_2 350 to destination chip 360), unless either of the cache chips had a different command/response without data that it could send in that gap (idle cycle time) in the data stream via its arbiter 320.

Now turning to FIG. 5, FIG. 5 illustrates a bus priority example timing diagram in accordance with exemplary embodiments. FIG. 5 illustrates processor cycles 1-6 in a top half and continues with cycles 7-12 in the bottom half. Examples are given utilizing arbiter 320 but apply for arbiters 320a-c.

At cycle 1, there is no request into the arbiter 320 so the arbiter 320 is idle for cycle 1, and there are no requests out of the arbiter 320.

At cycle 2, a response_0 is received in the arbiter 320, and the arbiter determines that the response_0 has 6 data components. The arbiter 320 sends out a response_0 header to, e.g., the receiving chip 310 at cycle 2.

At cycle 3, the input to the arbiter 320 is idle. The arbiter 320 continues the ongoing transfer of data from, e.g., memory elements 325 for the response_0. For example, for response_0 (which designates the first response request), the arbiter 320 outputs data component 1 from the cache line of the memory elements 325. The arbiter 320 is configured to determine the specific address within the cache line of the data requested by, e.g., the central processor 105. For this case, the arbiter 320 recognizes that the full cache line has 6 data components but the request into the arbiter 320 specifically requests data components 1-4. Since data components 1-4 are specifically requested by, e.g., the request of the central processor 105, the arbiter 320 is configured to send the data components 1-4 with a high priority (e.g., which may be designated as critical) and not interrupt this data stream of data components 1-4 at the high priority with requests (commands/responses) requesting data and/or not requesting data. During low priority data transfer, e.g., for data components 4-6, the arbiter 320 is configured to interrupt the data transfer of these data components 4-6 when a request (command/response) is to be sent without data. The arbiter 320 is configured to determine if a command/response is a request to transfer data (e.g. with data) and/or a request not transferring data (e.g., without data). The arbiter 320 is configured to reject commands/responses with data when high priority data and/or low priority data components are being transferred.

At cycle 4, the arbiter 320 receives command_0 (which is the first command) without a data request, and the arbiter 320 rejects the command_0. The arbiter 320 sends the data component 2 of the response_0.

At cycle 5, the input into the arbiter 320 is idle, and the arbiter sends data component 3 of the response_0.

At cycle 6, the arbiter 320 receives response_1 without data, and the arbiter 320 rejects the response_1. The arbiter 320 sends data component 4 of the response_0. Data component 4 is the last of the high priority data components for the response_0.

At cycle 7, the arbiter 320 receives command_1 without a request for data, and the arbiter 320 is configured to interrupt the processing of response_0 because the low priority data components (e.g., data components 5-6 are being processed) are being processed. The arbiter 320 is configured to allow and process the command_1 without data and outputs the command_1 without data. The command_1 utilizes 1 cycle since no data is required to be output by the arbiter 320.

At cycle 8, the arbiter 320 receives response_2 with a request for data, and the arbiter 320 is configured to reject this response_2 with data, because this response_2 would require more that 1 cycle to send. The arbiter 320 outputs data component 5 of the response_0 at cycle 8. However, if the response_2 did not request that data be sent, the arbiter 320 is configured interrupt the processing of the response_0 to send the response_2 without data.

At cycle 9, the arbiter 320 receives response_3 without a request for data, and the arbiter 320 is configured to interrupt response_0 and send the response_3 without data.

At cycle 10, the arbiter 320 receives the command_2 without a request for data, and the arbiter 320 is configured to interrupt response_0 and send the command_2 without data.

At cycle 11, the input to the arbiter 320 is idle, and the arbiter 320 is configured to send data component 6 of the response_0, which is the final data component of the cache line. In other words, the arbiter 320 has now sent a full cache line for the response_0.

At cycle 12, the input and output of the arbiter 320 are idle.

Note that the incoming requests (commands/responses) are processed, rejected, allowed, and/or sent out in the order in which they are received dependent on if high priority data is being transferred or not. The incoming requests are not cached and reordered based on priority in the arbiter 320 but rather the arbiter 320 is configured to allow as many commands/responses without data to be processed (depending on the desired design) during the transfer of low priority data components of a previous processing data transfer request; the arbiter 320 does not allow commands/responses to interrupt low priority data components when the commands/responses are requesting data transfer themselves. For example, the arbiter 320 may be configured to allow a preset maximum number of interruptions to the transfer of low priority data components. According to a particular design, the maximum number of interruptions may be based on the number of chip-to-chip interfaces required from the sending arbiter 320 on the sending chip 305 to the final destination chip (e.g., destination chip 360). For example, the arbiter 320 may be configured to allow 2 times, 3 times, 4 times, 5 times, 6 times, etc., the number of chip-to-chip interfaces. So for FIG. 3, there are 3 chip-to-chip interfaces and if the design is to allow 2 times (twice) the number of chip-to-chip interfaces to the final destination chip 360, the arbiter 320 may be configured to allow 6 (2×3) interruptions (as similarly described with reference FIG. 5). As understood by one skilled in the art, the number of interruptions to the transfer of low priority data components may be designed based on a desired preference.

For example, for sending low priority data components from the L3 cache 115 to L4 cache 110, the arbiter 320 of the L3 cache 115 is configured to allow, e.g., 6 cycles of interruptions of low priority data components. When sending low priority data components from the L4 cache 110 to the L3 cache 115, the arbiter 320 of the L4 cache 110 is configured to allow 30 cycles of interruptions. The allowed interruptions of the arbiter 320 are set differently based on each direction 170 and 180. As mentioned above, the arbiter 320, 320a, and 320c includes its respective counter 340, 340a, and 340c to count the number of interruptions, and when the interruptions reaches the maximum, the arbiter 320, 320a, and 320b is configured to reject new requests to interrupt the low priority data until the current data transfer of the low priority data components is completed.

The arbiter 320 (including arbiters 320a-c) may include logic gates implemented in hardware (along with firmware) and may include logic gates implemented in software to execute operations (e.g., cycle-by-cycle) of exemplary embodiments as understood by one skilled in the art. The arbiter 320 may include physical inputs (e.g., metal contacts) for receiving requests (commands/responses) and data, and outputs (e.g., metal contacts) for sending requests (commands/responses) and data as understood by one skilled in the art. The arbiter 320 includes all the hardware, software, and/or firmware to implement the logical operations discussed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer implemented method for controlling data stream interruptions on a shared bus, the method comprising:
   receiving a first request to transfer data,
   determining high priority data components and low priority data components for the first request, the high priority data components comprising a first portion of a cache line, and the low priority data components comprising a second portion of the cache line;
   transferring the high priority data components without interruptions;
   based on receiving further requests while transferring the high priority data components, rejecting the further requests;
   based on the transferring of the high priority data components being complete for the first request, transferring the low priority data components of the first request; and
   based on receiving other requests while transferring the low priority data components, allowing the other requests to interrupt the transferring of the low priority data up to a maximum allowed number of interruptions, the maximum allowed number of interruptions being based on a number of chip-to-chip interfaces for the first request.

2. The method of claim 1, further comprising transferring the low priority data components of the first request;

receiving other requests when transferring the low priority data components of the first request; and interrupting the transferring of the low priority data components of the first request to transfer the other requests.

3. The method of claim 1, further comprising transferring the low priority data components of the first request;

receiving other requests when transferring the low priority data components of the first request;

determining whether the other requests are with data and without data;

for the other requests with data, rejecting the other requests with data; and for the other requests without data, interrupting the transferring of the low priority data components for the first request.

4. The method of claim 3, further comprising transferring the other requests.

5. The method of claim 3, further comprising when the transferring of the low priority data components of the first request is complete, receiving a second request to transfer data having second high priority data components and second low priority data components; and transferring the second high priority data components of the second requests.

6. The method of claim 1, wherein the first request comprises a request for an address in a cache line, wherein the first portion of the cache line comprises the address in the cache line, and wherein the second portion of the cache line comprises a portion of the cache line that is not specifically requested by the first request.

7. An arbiter configured to control data stream interruptions on a shared bus, comprising:

an input and an output for receiving and sending;

logic gates configured to receive a first request to transfer data via the input, wherein the logic gates are configured to determine high priority data components and low priority data components for the first request, the high priority data components comprising a first portion of a cache line, and the low priority data components comprising a second portion of the cache line;

wherein the logic gates are configured to transfer the high priority data components without interruptions via the output;

wherein based on receiving further requests while transferring the high priority data components via the input, the logic gates are configured to reject the further requests;

wherein based on the transferring of the high priority data components being complete for the first request, the logic gates are configured to transfer the low priority data components of the first request; and based on receiving other requests while transferring the low priority data components, allowing the other requests to interrupt the transferring of the low priority data up to a maximum allowed number of interruptions, the maximum allowed number of interruptions being based on a number of chip-to-chip interfaces for the first request.

8. The arbiter of claim 7, wherein the logic gates are configured:

to transfer the low priority data components of the first request;

receive other requests when transferring the low priority data components of the first request; and interrupt the transferring of the low priority data components of the first request to transfer the other requests.

9. The arbiter of claim 7, wherein the arbiter is configured to:

transfer the low priority data components of the first request;

receive other requests when transferring the low priority data components of the first request;

determine whether the other requests are with data and without data;

for the other requests with data, reject the other requests with data; and for the other requests without data, interrupt the transferring of the low priority data components for the first request.

10. The arbiter of claim 9, wherein the logic gates are configured to transfer the other requests.

11. The arbiter of claim 9, wherein when the transfer of the low priority data components of the first request is complete, the logic gates are configured to receive a second request to transfer data having second high priority data components and second low priority data components; and wherein the logic gates are configured to transfer the second high priority data components of the second requests.

12. The arbiter of claim 7, wherein the first request comprises a request for an address in a cache line, wherein the first portion of the cache line comprises the address in the cache line, and wherein the second portion of the cache line comprises a portion of the cache line that is not specifically requested by the first request.

13. A computer implemented method for controlling data stream interruptions on a shared bus, the method comprising:

receiving a request to transfer data by an arbiter;

transferring high priority data components of the request, the high priority data components comprising a first portion of a cache line;

allowing the transfer of the high priority data components to be uninterrupted by other requests received at the arbiter;

based on the transferring of the high priority data components being complete for the request, transferring low priority data components of the request the low priority data components comprising a second portion of the cache line; and based on receiving other requests while transferring the low priority data components, allowing the other requests to interrupt the transferring of the low priority data up to a maximum allowed number of interruptions, the maximum allowed number of interruptions being based on a number of chip-to-chip interfaces for the first request.

14. The method of claim 13, further comprising allowing the transfer of the low priority data components to be interrupted by requests without data.

15. The method of claim 13, further comprising allowing the transfer of the low priority data components not to be interrupted by requests with data.

16. The method of claim 13, wherein the request comprises a request for an address in a cache line, wherein the first portion of the cache line comprises the address in the cache line, and wherein the second portion of the cache line comprises a portion of the cache line that is not specifically requested by the first request.

* * * * *